United States Patent
Damme et al.

(10) Patent No.: US 9,126,179 B2
(45) Date of Patent: *Sep. 8, 2015

(54) REACTOR FOR PREPARING POLYOLEFIN

(71) Applicant: Total Research & Technology Feluy, Seneffe (Feluy) (BE)

(72) Inventors: Eric Damme, Arquennes (BE); Louis Fouarge, Dilbeek (BE); Jerome Bette, Houston, TX (US); Alvaro Fernandez, Nivelles (BE); Aurelien Vantomme, Bois-de-Villers (BE); Renaud Oreins, Wavre (BE); Daniel Siraux, Naast (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,351

(22) Filed: Jul. 28, 2014

(65) Prior Publication Data

US 2014/0334984 A1    Nov. 13, 2014

Related U.S. Application Data

(60) Continuation of application No. 14/094,239, filed on Dec. 2, 2013, now Pat. No. 8,829,124, which is a division of application No. 13/521,070, filed as application No. PCT/EP2011/051524 on Feb. 3, 2011, now Pat. No. 8,642,710.

(30) Foreign Application Priority Data

Feb. 5, 2010   (EP) .................................. 10152827
Jul. 30, 2010  (EP) .................................. 10171373

(51) Int. Cl.
B01J 19/18    (2006.01)
C08F 2/00     (2006.01)
C08F 210/00   (2006.01)
(Continued)

(52) U.S. Cl.
CPC ............... B01J 19/2435 (2013.01); B01J 8/00 (2013.01); C08F 2/01 (2013.01); C08F 10/00 (2013.01); C08F 10/02 (2013.01); C08F 110/02 (2013.01); Y10T 428/139 (2015.01); Y10T 428/1352 (2015.01); Y10T 428/1393 (2015.01); Y10T 428/1397 (2015.01); Y10T 428/31855 (2015.04)

(58) Field of Classification Search
CPC ........ C08F 10/00; C08F 110/02; C08F 10/02; C08F 2/01; C08F 2/001; C08F 4/6548; C08F 2/14; C08F 4/6564; C08F 4/6557; B01J 8/00; B01J 19/2435; Y10T 428/1397; Y10T 428/139; Y10T 428/1393; Y10T 428/1352
USPC .................. 526/64, 348, 89, 90, 352; 422/129
See application file for complete search history.

(56) References Cited

U.S. PATENT DOCUMENTS 5,106,804 A    4/1992  Bailly et al.
5,153,158 A   10/1992  Kioka et al.
(Continued)

Primary Examiner — William Cheung

(57) ABSTRACT

The invention relates to a process for preparing polyolefin in a loop reactor. The polymer is prepared by polymerizing olefin monomers in the presence of a catalyst to produce a polyolefin slurry while pumping said slurry through said loop reactor by means of a pump. The present process is characterized in that the catalyst is fed in the loop reactor at a distance to the pump. The invention allows production of the polymer with advantageous properties while leading to fewer blockages of the reactor.

18 Claims, 2 Drawing Sheets

(51) Int. Cl.
*B01J 19/24* (2006.01)
*C08F 10/00* (2006.01)
*C08F 110/02* (2006.01)
*C08F 10/02* (2006.01)
*C08F 2/01* (2006.01)
*B01J 8/00* (2006.01)

(56) References Cited

U.S. PATENT DOCUMENTS

| | | |
|---|---|---|
| 5,594,071 A | 1/1997 | Takahashi et al. |
| 6,864,207 B2 | 3/2005 | Knoeppel et al. |
| 6,930,071 B2 | 8/2005 | Knoeppel et al. |
| 2009/0326170 A1* | 12/2009 | Dewachter ............ 526/64 |

* cited by examiner

REACTOR FOR PREPARING POLYOLEFIN

CROSS-REFERENCE TO RELATED APPLICATIONS

This application is a continuation of U.S. patent application Ser. No. 14/094,239, filed on Dec. 2, 2013, which is a divisional of U.S. application Ser. No. 13/521,070, filed on Jul. 9, 2012, now issued as U.S. Pat. No. 8,642,710, which claims the benefit of PCT/EP2011/051524, filed on Feb. 3, 2011, which claims priority from EP 10171373.3, filed on Jul. 30, 2010, and EP 10152827.1, filed Feb. 5, 2010.

TECHNICAL FIELD OF THE INVENTION

The present invention relates to a method of preparing polyolefin and to a loop reactor.

BACKGROUND OF THE INVENTION

Polyolefins, such as polyethylene (PE), are synthesized by polymerizing monomers, such as ethylene ($CH_2$=$CH_2$). Because it is cheap, safe, stable to most environments and easy to be processed polyolefins are useful in many applications. Polyethylene can be classified into several types, such as but not limited to LDPE (Low Density Polyethylene), LLDPE (Linear Low Density Polyethylene), and HDPE (High Density Polyethylene) as well as High Molecular Weight (HMW), Medium Molecular Weight (MMW) and Low Molecular Weight (LMW). Each type of polyethylene has different properties and characteristics.

Olefin (such as ethylene) polymerizations are frequently carried out in a loop reactor using monomer (such as ethylene), diluent and catalyst, optionally an activating agent, optionally one or more co-monomer(s), and optionally hydrogen.

Polymerization in a loop reactor is usually performed under slurry conditions, with the produced polymer usually in a form of solid particles suspended in diluent. The slurry is circulated continuously in the reactor with a pump to maintain efficient suspension of the polymer solid particles in the liquid diluent. Polymer slurry is discharged from the loop reactor by means of settling legs, which operate on a batch principle to recover the slurry. Settling in the legs is used to increase the solid concentration of the slurry finally recovered as product slurry. The product slurry is further discharged through heated flash lines to a flash tank, where most of the diluent and unreacted monomers are flashed off and recycled.

Optionally, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be mixed and pelletized.

During the mixing step, polymer product and optional additives are mixed intimately in order to obtain a compound as homogeneous as possible. Preferably, mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Production of polyolefin involves the polymerization of olefin monomer in the reactor in the presence of a catalyst and optionally, if required depending on the used catalyst, an activating agent. Typically, the catalyst is used in particulate form. The polyolefin is produced as a resin/powder with a hard catalyst particle at the core of each grain of the powder.

We have found that production of polyolefin can lead to complications such as partial—or even complete—blockage of the loop reactor. These problems can be even more pronounced with particular polyolefins, such as polyethylenes. Blockage may require stopping the production process and unclogging and cleaning the reactor before production can be restarted. In view of the above, there remains a need in the art for an improved polyolefin production process, particularly for polyethylene and the present invention aims to provide such improvements.

SUMMARY OF THE INVENTION

Accordingly, the present invention is directed to reactors and processes for improving the preparation of polyolefin. According to a first aspect of the present invention, a process of preparing polyolefin in a loop reactor is provided by:
 (a) feeding into said loop reactor diluent, olefin monomers, optionally one or more comonomers, and optionally hydrogen;
 (b) feeding into said loop reactor a catalyst and optionally an activating agent; and
 (c) polymerizing said olefin monomers to produce a polyolefin slurry comprising diluent and solid polyolefin particles while pumping said slurry through said loop reactor by means of a pump,
characterized in that the catalyst is fed into said loop reactor spatially separated from said pump and at a distance upstream to the pump of at least 20% of the length of the reactor path.

According to a second aspect, the present invention also encompasses a loop reactor suitable for the polymerization of olefin monomer, wherein said reactor is configured to perform the process according to the first aspect of the invention and wherein said reactor comprises:
 a plurality of interconnected pipes defining a reactor path for a polymer slurry, said polymer slurry comprising monomer, diluent, a catalyst, solid olefin polymer particles, optionally one or more co-monomer(s), optionally hydrogen, and optionally an activating agent;
 means for feeding monomer, diluent, optionally one or more co-monomer(s) and optionally hydrogen in the reactor;
 means for feeding catalyst in the reactor;
 optionally means for feeding an activating agent in the reactor; and
 a pump suitable for maintaining the polymer slurry in circulation in said reactor,
characterized in that said means for feeding said catalyst in the reactor is spatially separated from the pump with a distance upstream to the pump of at least 20% of the length of the reactor path.

The present inventors have found that the process and reactor according to the invention allow production of polyolefin with fewer problems related to blockage and that subsequently can be easily extruded and that has favorable properties.

DETAILED DESCRIPTION OF THE INVENTION

Figure 1:
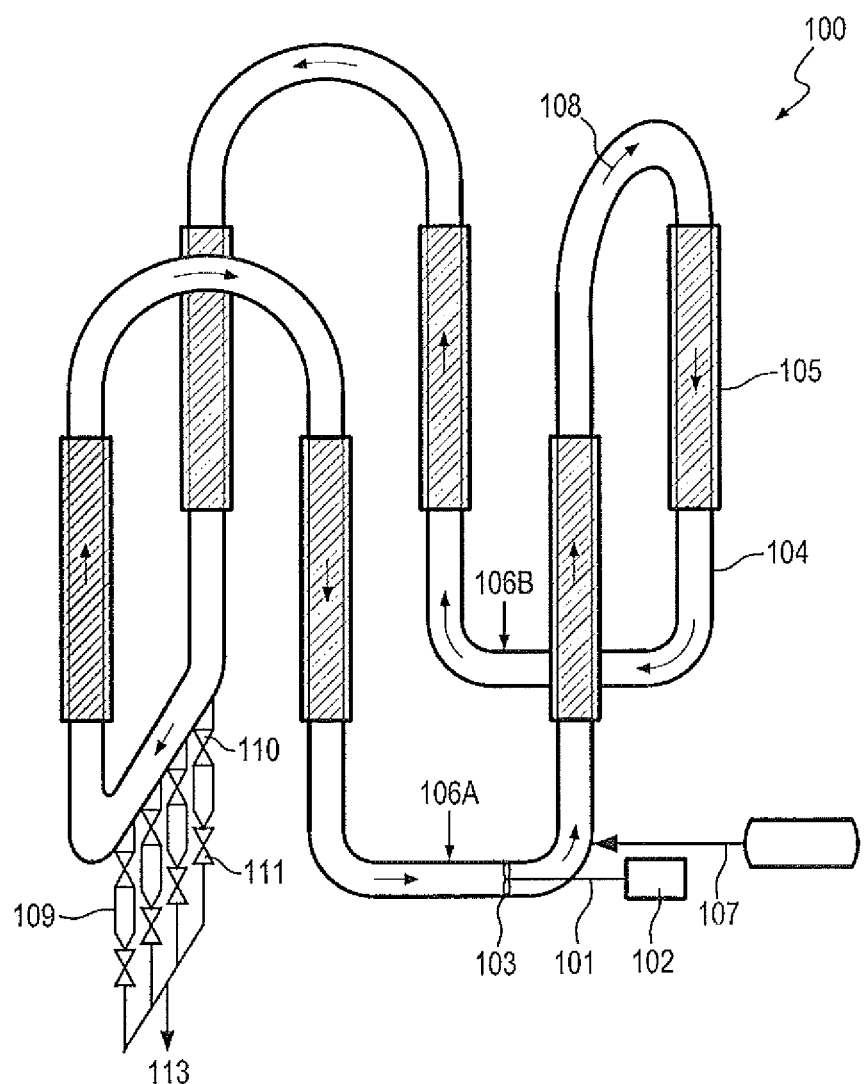
FIG. 1 schematically illustrates a loop reactor that can be used in the preparation of the polyethylene according to an embodiment of the present invention.

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a process of preparing polyolefin in a loop reactor, preferably polyethylene, comprising:

(a) feeding into said loop reactor diluent, olefin monomers, optionally one or more comonomers, and optionally hydrogen;

(b) feeding into said loop reactor a catalyst and optionally an activating agent; and (c) polymerizing said olefin monomers to produce a polyolefin slurry comprising diluent and solid polyolefin particles while pumping said slurry through said loop reactor by means of a pump, characterized in that the catalyst is fed into said loop reactor spatially separated from said pump and at a distance upstream to the pump of at least 20% of the length of the reactor path, more preferably at least 30%, most preferably at least 40%, more preferably at least 50%, at least 60%, at least 70%, at least 80%, at least 90%, at least 95% of the length of the reactor path.

The pump is usually provided in the loop reactor in an elbow section of a pipe, provides with flanges at each end, and said elbow section is operably connected to the next segments by flanges. The impeller pushes the liquid in a direction parallel to the pump shaft toward the outlet of the elbow section. In an embodiment, the catalyst may be injected at any distance upstream to the pump of at least 20% of the length of the reactor path, up to the outlet flange of the pump.

Preferably the process is performed in a double loop reactor.

Polymers with a bimodal or multimodal molecular weight distribution may be produced. By the term "polymers with a bimodal molecular weight distribution" or "bimodal polymers" it is meant, polymers having two maxima in their molecular weight distribution curves. By the term "polymers with a multimodal molecular weight distribution" or "multimodal" polymers it is meant polymers with at least two, preferably above two maxima in their molecular weight distribution curves. Preferably, the polyolefin is polyethylene, preferably bimodal polyethylene.

Preferably, the polyethylene has an HLMI of larger than 0.015 g/10 min, more preferably larger than 0.03 g/10 min, most preferably larger than 0.06 g/10 min and preferably smaller than 12 g/10 min, more preferably smaller than 6.25 g/10 min, most preferably smaller than 2 g/10 min.

Preferably, said polyolefin, preferably polyethylene, has an HLMI of from 0.015 to 12 g/10 min and a density of from 0.915 to 0.945 g/cm$^3$.

The HLMI is determined with the ASTM D-1238 standardized test which measures HL275 at a temperature of 190° C. and under a load of 21.6 kg, except that a die of 2.75 mm broad instead of 2.05 mm was used and wherein HLMI=HL275/3.2. The HLMI is preferably determined after production of the fraction in the reactor (i.e. fluff) and/or before subsequent processing in dryers and extruders (i.e. pellets). In case of bimodal polymer distributions, the HLMI may be determined by measuring one or more of the fractions and/or the bimodal polymer end product and using the following formula:

$$\text{Log HLMI}_{\mathit{final}=wt\ \%1st} \times \text{Log HLMI}_{1st+wt\ \%2nd} \times \text{Log HLMI}_{2nd}$$

wherein
"final" means "of the polyethylene resin"
"1st" means "of the polyethylene fraction produced in the first reactor"
"2nd" means "of the polyethylene fraction produced in the second reactor, downstream of the first reactor"

Preferably, the polyethylene from the reactor has a density of larger than 0.915 g/cm$^3$, more preferably larger than 0.920 g/cm$^3$ and preferably smaller than to 0.945 g/cm$^3$, more preferably smaller than 0.940 g/cm$^3$. The density is determined with the ASTM D-1505 standardized test at a temperature of 23° C. The density is preferably determined after production of the fraction in the reactor (i.e. fluff) and/or before subsequent processing in dryers and/or extruders (i.e. pellets). In case of bimodal polymer distributions, the density may be determined by measuring one or more of the fractions and/or the bimodal polymer end product and using the following formula:

$$density_{final} = wt\%_{1st} \times density_{1st} + wt\%_{2nd} \times density_{2nd}$$

wherein
"final" means "of the polyethylene resin"
"1st" means "of the polyethylene fraction produced in the first reactor"
"2nd" means "of the polyethylene fraction produced in the second reactor, downstream of the first reactor"

In an embodiment, the polyolefin of the present the invention are preferably combined with one or more other polyolefin fractions into a bimodal distribution.

In a preferred embodiment, the polyolefin is bimodal polyethylene, prepared in a double loop reactor.

The polyolefin, particularly the polyethylene, of the invention is useful for all application, such as pipes, and all resins applications, for example, for pipe, blow molding or film applications.

The polyolefin is prepared by feeding diluent, olefin monomers, optionally one or more co-monomers, and optionally hydrogen into the loop reactor. Catalyst and optionally activating agent are fed into the loop reactor creating a slurry. Said slurry is circulated through the loop reactor by means of a pump. The olefin monomers are polymerized to produce a polyolefin slurry comprising diluent and solid polyolefin particles while circulating said slurry through said loop reactor by means of a pump, The process is further characterized in that the catalyst is fed into said loop reactor spatially separated from said pump and at a distance upstream to the pump of at least 20% of the length of the reactor path, for example at least 30%, for example at least 40%, for example at least 50%, at least 60%, at least 70%, at least 80%, at least 90%, at least 95%, of the length of the reactor path.

Polymerization of olefin is preferably carried out in a loop reactor by feeding olefin monomers (preferably ethylene), optionally a co-monomer (such as hexene-1), diluent (such as isobutane), a catalyst, optionally a activating agent and optionally hydrogen to a loop reactor. A preferred process feeds olefin monomer into the loop reactor in step a) at a temperature of lower than 15° C. and preferably at a temperature of from 5 to 10° C.

As used herein, the term "diluent" refers to diluents in liquid form that is in a liquid state, liquid at room temperature and preferably liquid under the pressure conditions in the loop reactor. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

The term "co-monomer" refers to olefin co-monomers which are suitable for being polymerized with olefin monomers, preferably ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene. The term "co-polymer" refers to a polymer, which is made by linking two different types of in the same polymer chain. The term "homo-polymer" refers to a polymer which is made by linking olefin (preferably ethylene) monomers, in the absence of co-monomers.

The process of the invention uses a catalyst, preferably, a Ziegler-Natta catalyst. As used herein, the "catalyst" refers to a substance that causes a change in the rate of a polymerization reaction without itself being consumed in the reaction. In the present invention it is especially applicable to catalysts suitable for the polymerization of olefin to polyolefin and, in the present invention, it is especially applicable to Ziegler-Natta catalysts. The term "Ziegler-Natta catalysts" or "ZN catalysts" refers to catalysts preferably of the general formula $MX_n$, wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Preferred ZN catalysts according to the invention are described in U.S. Pat. Nos. 6,930,071 and 6,864,207, which are incorporated herein by reference.

As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form a sediment or deposit.

Preferably, the catalyst is present with an average particle diameter (d50) smaller than 50 μm, and more preferably smaller than 25 μm, preferably smaller than 20 μm, most preferably smaller than 10 μm and preferably larger than 3 μm. The d50 is measured by laser diffraction analysis on a Malvern type analyzer after having put the catalyst in suspension in cyclohexane. The d50 is defined as the particle size for which fifty percent by volume of the particles has a size lower than the d50. Malvern systems include the Malvern 2000, Malvern 2600 and Malvern 3600 series. The Malvern MasterSizer may also be useful as it can more accurately measure the d50 towards the lower end of the range e.g. for average particle sizes of less 8 μm, by applying the theory of Mie, using appropriate optical models.

Preferably, the catalyst is fed into the loop reactor under diluent flushing (preferably isobutane flushing) at a rate of larger than 100 kg/h, more preferably larger than 200 kg/h and preferably lower than 250 kg/h. We have found that this leads to fewer blockage of the reactor, for instance at the catalyst feeding site.

Preferably, the catalyst is fed into the loop reactor with a velocity at least 7 m/s, more preferably at least 10 m/s and preferably at most 40 m/s. Surprisingly, we have found that this leads to fewer blockage of the reactor, for instance at the catalyst feeding site.

Preferably, the catalyst is fed into the loop reactor under diluent flushing at a rate of larger than 100 kg/h and with a velocity at least 7 m/s.

Preferably, the catalyst is fed to the reactor in step b) in a catalyst slurry at a concentration at the feeding site of lower than 1.0% by weight, more preferably lower than 0.8% by weight, and preferably higher than 0.1% by weight. Surprisingly, this leads to fewer blockage problems in the catalyst feeding lines and/or the catalyst slurry storage tank.

A preferred process according to the invention uses an activating agent. The term "activating agent" refers to materials that can be used in conjunction with a catalyst in order to improve the activity of the catalyst during the polymerization reaction. In the present invention, it particularly refers to an organoaluminium compound, being optionally halogenated, having general formula $AlR^1R^2R^3$ or $AlR^1R^2Y$, wherein $R^1$, $R^2$, $R^3$ is an alkyl having from 1 to 6 carbon atoms and $R^1$, $R^2$, $R^3$ may be the same or different and wherein Y is hydrogen or a halogen, as disclosed in U.S. Pat. Nos. 6,930,071 and 6,864,207, which are incorporated herein by reference. Preferred activating agents are Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). TEAl is particularly preferred.

Preferably, the activating agent added to the loop reactor in a activating agent slurry at a concentration of less than 90% by weight of the activating agent slurry composition, more preferably from 10 to 50% by weight, for instance around 20% by weight. Preferably, the concentration of the activating agent in the loop reactor is lower than 200 ppm, more preferably from 10 to 100 parts per million, most preferably from 20-70 ppm and for instance around 50 ppm.

According to one embodiment of the invention, the activating agent is preferably fed at another site into the loop reactor as compared to the feeding site of the catalyst and, more preferably, the catalyst is fed in the loop reactor at a distance (preferably upstream or downstream) to means for feeding the activating agent of at least 15%, more preferably at least 20%, most preferably at least 25%, at least 30%, at least 40% of the length of the reactor path.

According to another embodiment of the invention, the catalyst and the activating agent are preferably mixed before addition to the loop reactor. In that embodiment, the activating agent is referred as "preactivating agent". In that embodiment, the combination of catalyst and activating agent is preferably fed at the preferred location for the catalyst, i.e. spatially separated from the pump and at a distance upstream to the pump of at least 20%, more preferably at least 30%, most preferably at least 40%, more preferably at least 50%, at least 60%, at least 70%, at least 80%, at least 90%, at least 95% of the length of the reactor path. The catalyst may be injected at any distance from at least 20% upstream of the pump up to the outlet flange of the pump.

Particularly preferred catalyst for use in the present invention is a Ziegler-Natta catalyst system comprising a Ziegler-Natta catalyst component D and a preactivating agent, wherein the Ziegler Natta catalyst component D is obtainable by:

a) generating a reaction product A by contacting a magnesium dialkoxide compound with a halogenating agent;
b) contacting reaction product A with a first halogenating/titanating agent to form reaction product B;
c) contacting reaction product B with a second halogenating/titanating agent to form reaction product C; and
d) contacting reaction product C with a third halogenating/titanating agent to form catalyst component D.

Preferably the catalyst is made according to a process comprising the following steps: a) contacting a magnesium dialkoxide compound with a halogenating agent to form a reaction product A; b) contacting reaction product A with a first halogenating/titanating agent to form reaction product B; c) contacting reaction product B with a second halogenating/titanating agent to form reaction product C; and d) contacting reaction product C with a third halogenating/titanating agent to form reaction product D. The second and third halogenating/titanating agents can comprise titanium tetrachloride. The second and third halogenating/titanating steps can each comprise a titanium to magnesium ratio in the range of about 0.1 to 5. The reaction products A, B and C can each be washed with a hydrocarbon solvent prior to subsequent halogenating/titanating steps. The reaction product D can be washed with a hydrocarbon solvent until titanium species [Ti] content is less than about 100 mmol/L.

In an embodiment, a method for making a catalyst component generally includes the steps of forming a metal dialkoxide from a metal dialkyl and an alcohol, halogenating the metal dialkoxide to form a reaction product, contacting the reaction product with one or more halogenating/titanating agent in three or more steps to form a catalyst component, and then treating the catalyst component with a preactivation agent such as an organoaluminum.

One embodiment of the method for making a catalyst can be generally as follows:

  1.

  2.

  3.

  4.

  5.

  6.

In the above formulas, $M^1$ can be any suitable metal, usually a Group IIA metal, typically Mg. In the above formulas, R, R', R'', R''', and R'''' are each independently hydrocarbyl or substituted hydrocarbyl moieties, with R and R' having from 1 to 20 carbon atoms, generally from 1 to 10 carbon atoms, typically from 2 to 6 carbon atoms, and can have from 2 to 4 carbon atoms. R'' generally comprises from 3 to 20 carbon atoms, R''' generally comprises from 2-6 carbon atoms, and R'''' generally comprises from 2-6 carbon atoms and is typically butyl. Any combination of two or more of R, R', R'', R''', and R'''' can be used, may be the same, or the combination of the R groups may be different from one another.

In the above embodiment comprising formula $ClAR'''_{x1}$ A is a non-reducing oxyphilic compound which is capable of exchanging one chloride for an alkoxide, R''' is a hydrocarbyl or substituted hydrocarbyl, and x is the valence of A minus 1. Examples of A include titanium, silicon, aluminum, carbon, tin and germanium, typically is titanium or silicon wherein x is 3. Examples of R''' include methyl, ethyl, propyl, isopropyl and the like having 2-6 carbon atoms. No limiting examples of a chlorinating agent that can be used in the method are ClTi(O$^1$Pr)$_3$ and ClSi(Me)$_3$.

The metal dialkoxide of the above embodiment is chlorinated to form a reaction product "A". While the exact composition of product "A" is unknown, it is believed that it contains a partially chlorinated metal compound, one example of which may be ClMg(OR").

Reaction product "A" is then contacted with one or more halogenating/titanating agent, such as for example a combination of TiCl$_4$ and Ti(OBu)$_4$, to form reaction product "B". Reaction product "B" which is probably a complex of chlorinated and partially chlorinated metal and titanium compounds. Reaction product "B" can comprise a titanium impregnated MgCl$_2$ support and for example, may possibly be represented by a compound such as (MCl$_2$)$_y$ (TiCl$_x$(OR)$_{4-x}$)$_z$. Reaction product "B" can be precipitated as a solid from the catalyst slurry.

The second halogenation/titanation step produces reaction product, or catalyst component, "C" which is also probably a complex of halogenated and partially halogenated metal and titanium compounds but different from "B" and may possibly be represented by (MCl$_2$)$_y$ (TiCl$_{x'}$(OR)$_{4-x'}$)$_{z'}$. It is expected that the level of halogenation of "C" would be greater than that of product "B". This greater level of halogenation can produce a different complex of compounds.

The third halogenation/titanation step produces a reaction product, or catalyst component, "D" which is also probably a complex of halogenated and partially halogenated metal and titanium compounds but different from "B" and "C", and may possibly be represented by (MCl$_2$)$_y$ (TiCl$_{x''}$(OR)$_{4-x''}$)$_{z''}$. It is expected that the level of halogenation of "D" would be greater than that of product "C". This greater level of halogenation would produce a different complex of compounds. While this description of the reaction products offers the most probable explanation of the chemistry at this time, the method is not limited by this theoretical mechanism.

Metal dialkyls and the resultant metal dialkoxides suitable for use in the method can include any that can be utilized in the method to yield a suitable polyolefin catalyst. These metal dialkoxides and dialkyls can include Group IIA metal dialkoxides and dialkyls. The metal dialkoxide or dialkyl can be a magnesium dialkoxide or dialkyl. Non-limiting examples of suitable magnesium dialkyls include diethyl magnesium, dipropyl magnesium, dibutyl magnesium, butylethylmagnesium, etc. Butylethylmagnesium (BEM) is one suitable magnesiumdialkyl.

In the practice of the method, the metal dialkoxide can be a magnesium compound of the general formula Mg(OR")$_2$ where R" is a hydrocarbyl or substituted hydrocarbyl of 1 to 20 carbon atoms.

The metal dialkoxide can be soluble and is typically non-reducing. A non-reducing compound has the advantage of forming MgCl$_2$ instead of insoluble species that can be formed by the reduction of compounds such as MgRR', which can result in the formation of catalysts having a broad particle size distribution. In addition, Mg(OR")$_2$, which is less reactive than MgRR', when used in a reaction involving chlorination with a mild chlorinating agent, followed by subsequent halogenation/titanation steps, can result in a more uniform product, e.g., better catalyst particle size control and distribution.

Non-limiting examples of species of metal dialkoxides which can be used include magnesium butoxide, magnesium pentoxide, magnesium hexoxide, magnesium di(2-ethylhexoxide), and any alkoxide suitable for making the system soluble.

As a non-limiting example, magnesium dialkoxide, such as magnesium di(2-ethylhexoxide), may be produced by reacting an alkyl magnesium compound (MgRR') with an alcohol (ROH), as shown below. MgRR'+2R"OH→Mg(OR")$_2$+RH+R'H The reaction can take place at room temperature and the reactants form a solution. R and R' may each be any alkyl group of 1-10 carbon atoms, and may be the same or different. Suitable MgRR' compounds include, for example, diethyl magnesium, dipropyl magnesium, dibutyl magnesium and butyl ethyl magnesium. The MgRR' compound can be BEM, wherein RH and R'H are butane and ethane, respectively.

In the practice of the method, any alcohol yielding the desired metal dialkoxide may be utilized. Generally, the alcohol utilized may be any alcohol of the general formula R"OH where R" is an alkyl group of 2-20 carbon atoms, the carbon atoms can be at least 3, at least 4, at least 5, or at least 6 carbon atoms. Non-limiting examples of suitable alcohols include ethanol, propanol, isopropanol, butanol, isobutanol, 2-methyl-pentanol, 2-ethylhexanol, etc. While it is believed that almost any alcohol may be utilized, linear or branched, a higher order branched alcohol, for example, 2-ethyl-1-hexanol, can be utilized.

The amount of alcohol added can vary, such as within a non-exclusive range of 0 to 10 equivalents, is generally in the range of about 0.5 equivalents to about 6 equivalents (equivalents are relative to the magnesium or metal compound throughout), and can be in the range of about 1 to about 3 equivalents.

Alkyl metal compounds can result in a high molecular weight species that is very viscous in solution. This high viscosity may be reduced by adding to the reaction an aluminum alkyl such as, for example, triethylaluminum (TEAl), which can disrupt the association between the individual alkyl metal molecules. The typical ratio of alkyl aluminum to metal can range from 0.001:1 to 1:1, can be 0.01 to 0.5:1 and also can range from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and can range from 0.1:1 to 1:1.

Agents useful in the step of halogenating the metal alkoxide include any halogenating agent which when utilized in the method will yield a suitable polyolefin catalyst. The halogenating step can be a chlorinating step where the halogenating agent contains a chloride (i.e, is a chlorinating agent).

Halogenating of the metal alkoxide compound is generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is generally in the range of about 6:1 to about 1:3, can be in the range of about 3:1 to about 1:2, can be in the range of about 2:1 to about 1:2, and can also be about 1:1.

The halogenating step is generally carried out at a temperature in the range of about 0° C. to about 100° C. and for a reaction time in the range of about 0.5 to about 24 hours. The halogenating step can be carried out at a temperature in the range of about 20° C. to about 90° C. and for a reaction time in the range of about 1 hour to about 4 hours.

Once the halogenating step is carried out and the metal alkoxide is halogenated, the halide product "A" can be subjected to two or more halogenating/titanating treatments.

The halogenation/titanation agents utilized can be blends of two tetra-substituted titanium compounds with all four substituents being the same and the substituents being a halide or an alkoxide or phenoxide with 2 to 10 carbon atoms, such as $TiCl_4$ or $Ti(OR'''')_4$. The halogenation/titanation agent utilized can be a chlorination/titanation agent.

The halogenation/titanation agent may be a single compound or a combination of compounds. The method provides an active catalyst after the first halogenation/titanation; however, there are desirably a total of at least three halogenation/titanation steps.

The first halogenation/titanation agent is typically a mild titanation agent, which can be a blend of a titanium halide and an organic titanate. The first halogenation/titanation agent can be a blend of $TiCl_4$ and $Ti(OBu)_4$ in a range from 0.5:1 to 6:1 $TiCl_4/Ti(OBu)_4$, the ratio can be from 2:1 to 3:1 ("OBu" represents butoxide). It is believed that the blend of titanium halide and organic titanate react to form a titanium alkoxyhalide, $Ti(OR)_aX_b$, where OR and X are alkoxide and halide, respectively and a+b is the valence of titanium, which is typically 4.

In the alternative, the first halogenation/titanation agent may be a single compound. Examples of a first halogenation/titanation agent are $Ti(OC_2H_5)_3Cl$, $Ti(OC_2H_5)_2Cl_2$, $Ti(OC_3H_7)_2Cl_2$, $Ti(OC_3H_7)_3Cl$, $Ti(OC_4H_9)Cl_3$, $Ti(OC_6H_{13})_2Cl_2$, $Ti(OC_2H_5)_2Br_2$, and $Ti(OC_{12}H_5)Cl_3$.

The first halogenation/titanation step is generally carried out by first slurrying the halogenation product "A" in a hydrocarbon solvent at room temperature/ambient temperature. No limiting examples of suitable hydrocarbons solvent include heptane, hexane, toluene, octane and the like. The product "A" can be at least partially soluble in the hydrocarbon solvent.

A solid product "B" is precipitated at room temperature following the addition of the halogenation/titanation agent to the soluble product "A". The amount of halogenation/titanation agent utilized must be sufficient to precipitate a solid product from the solution. In general, the amount of halogenation/titanation agent utilized, based on the ratio of titanium to metal, will generally be in the range of about 0.5 to about 5, typically in the range of about 1 to about 4, and can be in the range about 1.5 to about 2.5. An example is $TiCl_4$/titanium (IV) butoxide (TNBT).

The solid product "B" precipitated in this first halogenation/titanation step is then recovered by any suitable recovery technique, and then washed at room/ambient temperature with a solvent, such as hexane. Generally, the solid product "B" is washed until the [Ti] is less than about 100 mmol/L. Within the method [Ti] represents any titanium species capable of acting as a second generation Ziegler catalyst, which would comprise titanium species that are not part of the reaction products as described herein. The resulting product "B" is then subjected to a second and third halogenating/titanating steps to produce products "C" and "D". After each halogenating/titanating step the solid product can be washed until the [Ti] is less than a desired amount. For example, less than about 100 mmol/L, less than about 50 mmol/L, or less than about 10 mmol/L. After the final halogenating/titanating step, the product can be washed until the [Ti] is less than a desired amount, for example, less than about 20 mmol/L, less than about 10 mmol/L, or less than about 1.0 mmol/L. It is believed that a lower [Ti] can produce improved catalyst results by reducing the amount of titanium that can act as a second generation Ziegler species. It is believed that a that a lower [Ti] can be a factor in producing improved catalyst results such as a narrower MWD.

The second halogenation/titanation step is generally carried out by slurrying the solid product recovered from the first titanation step, solid product "B", in a hydrocarbon solvent. Hydrocarbon solvents listed as suitable for the first halogenation/titanation step may be utilized. The second and third halogenation/titanation steps can utilize a different compound or combination of compounds from the first halogenation/titanation step. The second and third halogenation/titanation steps can utilize the same agent at a concentration that is stronger than that used in the first halogenation/titanation agent, but this is not a necessity. The second and third halogenating/titanating agents can be a titanium halide, such as titanium tetrachloride ($TiCl_4$). The halogenation/titanation agent is added to the slurry. The addition can be carried out at ambient/room temperature, but can also be carried out at temperatures and pressures other than ambient.

Generally, the second and third halogenation/titanation agents comprise titanium tetrachloride. Typically the second and third halogenation/titanation steps each comprise a titanium to magnesium ratio in a range of about 0.1 to 5, a ratio of about 2.0 can also be used, and a ratio of about 1.0 can be used. The third halogenation/titanation step is generally carried out at room temperature and in a slurry, but can also be carried out at temperatures and pressures other than ambient.

The amount of titanium tetrachloride utilized, or alternate halogenation/titanation agent, may also be expressed in terms of equivalents, an equivalent herein is amount of titanium relative to the magnesium or metal compound. The amount of titanium of each of the second and third halogenating/titanating steps will generally be in the range of about 0.1 to about 5.0 equivalents, can be in the range of about 0.25 to about 4 equivalents, typically is in the range of about 0.3 to about 3 equivalents, and it can be desirable to be in the range of about 0.4 to about 2.0 equivalents. In one particular embodiment, the amount of titanium tetrachloride utilized in each of the second and third halogenation/titanation steps is in the range of about 0.45 to about 1.5 equivalent.

The catalyst component "D" made by the above described process may be combined with an organometallic catalyst component (a "preactivating agent") to form a preactivated catalyst system suitable for the polymerization of olefins. Typically, the preactivating agents which are used together with the transition metal containing catalyst component "D" are organometallic compounds such as aluminum alkyls, aluminum alkyl hydrides, lithium aluminum alkyls, zinc alkyls, magnesium alkyls and the like. Preferably, the preactivating agent is selected from the group consisting of trialkylaluminums, dialkylaluminum halides, and alkylaluminum dihalides.

The preactivating agent is preferably an organoaluminum compound. The organoaluminum preactivating agent is typically an aluminum alkyl of the formula $AlR_3$ wherein at least one R is an alkyl having 1-8 carbon atoms or a halide, and wherein each of the R may be the same or different. Suitable preactivating agents include trialkyl aluminum such as, for example, trimethyl aluminum (TMA), triethylaluminum (TEAL), triisobutylaluminum (TIBAL) and also include diethylaluminum chloride, triisobutylaluminum chloride, butylaluminum dichloride, and the like, and mixtures thereof. The organoaluminum preactivating agent is more preferably trimethyl aluminum (TMA), triethyl aluminum (TEAL), triisobutyl aluminum (TIBAL) or mixtures thereof. Preferably, the preactivating agent is TEAL, since with TEAL the molecular weight distribution (MWD) of the bimodal polyethylene prepared in the two reactors in series is even wider than when using other organoaluminum preactivating agents. Generally, when using TEAL as the preactivating agent the MWD will be at least 5, preferably at least 6.

In general, the ratio of Al to titanium can be in the range from 0.1:1 to 2:1 and typically is 0.25:1 to 1.2:1.

Optionally, the Ziegler-Natta catalyst may be pre-polymerized. Generally, a prepolymerization process is affected by contacting a small amount of monomer with the catalyst after the catalyst has been contacted with the preactivating agent. A prepolymerization process is described in U.S. Pat. Nos. 5,106,804; 5,153,158; and 5,594,071, hereby incorporated by reference.

Optionally, an electron donor may be added with the halogenation agent, the first halogenation/titanation agent, or the subsequent halogenation/titanation agent or agents. It may be desirable to have an electron donor utilized in the second halogenation/titanation step. Electron donors for use in the preparation of polyolefin catalysts are well known, and any suitable electron donor may be utilized in the method that will provide a suitable catalyst. Electron donors, also known as Lewis bases, are organic compounds of oxygen, nitrogen, phosphorous, or sulfur which can donate an electron pair to the catalyst.

The electron donor may be a monofunctional or polyfunctional compound, can be selected from among the aliphatic or aromatic carboxylic acids and their alkyl esters, the aliphatic or cyclic ethers, ketones, vinyl esters, acryl derivatives, particularly alkyl acrylates or methacrylates and silanes. An example of a suitable electron donor is di-n-butyl phthalate. A generic example of a suitable electron donor is an alkylsilylalkoxide of the general formula $RSi(OR')_3$, e.g., methylsilyitriethoxide [$MeSi(OEt)_3$], where R and R' are alkyls with 1-5 carbon atoms and may be the same or different. ("OEt" represents "ethoxy")

For the polymerization process, an internal electron donor can be used in the synthesis of the catalyst and an external electron donor or stereoselectivity control agent (SCA) to activate the catalyst at polymerization. An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethylphenyl and diphenylcarbonate; succinic acid esters, such as mono and diethyl succinate.

External donors which may be utilized in the preparation of a catalyst include organosilane compounds such as alkoxysilanes of general formula $SiR_m(OR')_{4-m}$, where R is selected from the group consisting of an alkyl group, a cycloalkyl group, an aryl group and a vinyl group; R' is an alkyl group; and m is 0-3, wherein R may be identical with R'; when m is 0, 1 or 2, the R' groups may be identical or different; and when m is 2 or 3, the R groups may be identical or different.

The external donor of the method can be selected from a silane compound of the following formula: wherein $R_1$ and $R_4$ are both an alkyl or cycloalkyl group containing a primary, secondary or tertiary carbon atom attached to the silicon, $R_1$ and $R_4$ being the same or different; $R_2$ and $R_3$ are alkyl or aryl groups. $R_1$ may be methyl, isopropyl, cyclopentyl, cyclohexyl or t-butyl; $R_2$ and $R_3$ may be methyl, ethyl, propyl, or butyl groups and not necessarily the same; and $R_4$ may also methyl, isopropyl, cyclopentyl, cyclohexyl or t-butyl. Specific external donors are cyclohexylmethyldimethoxy silane (CMDS), diisopropyldimethoxysilane (DIDS) cyclohexyl isopropyl dimethoxysilane (CIDS), dicyclopentyldimethoxysilane (CPDS) or di-t-butyl dimethoxysilane (DTDS).

Preferably, the preactivating agent is an organoaluminium compound, preferably of the formula $AlR_3$, wherein R is an alkyl having 1-8 carbon atoms or a halide, and wherein each R may be the same or different. More preferably, the organoaluminium compound is TEAL.

Preferably, the halogenating agent is $ClTi(OPr)_3$.

Preferably, the first halogenating/titanating agent a mixture of $TiCl_4$ and $Ti(OBu)_4$, in a molar ratio range of from 0.5:1 to 6:1 of $TiCl_4/Ti(OBu)_4$. More preferably the molar ratio is 2:1 of $TiCl_4/Ti(OBu)_4$.

Preferably, the second halogenating/titanating agent is $TiCl_4$.

Preferably, the third halogenating/titanating agent is also $TiCl_4$.

According to the invention, the polyolefin of the invention can be prepared by reacting olefin monomer in the presence of a catalyst in a loop reactor with a pump, wherein the catalyst is preferably fed into the reactor spatially separated from said pump and at a distance upstream to the pump of at least 20%, more preferably at least 25%, more preferably at least 30%, for example at least 40%, for example at least 50%, at least 60%, at least 70%, at least 80%, at least 90%, at least 95%, of the length of the reactor path. The term "upstream" of the pump, refers to the direction opposite (against) the direction of the flow of circulation.

Preferably, the loop reactor consists of a plurality of interconnected pipes, defining a reactor path. The terms "path" and "flow path" of the reactor are used herein as synonyms and are defined as the internal route followed by the reactant stream and the formed polymer slurry in the reactor.

Preferably, the reactor comprises at least one loop. More preferably, the reactor is connected to another loop reactor, creating a double loop reactor. Most preferably the reactor is connected in series with the other loop reactor, creating a double loop reactor connected in series. Reaction conditions are preferably different in each of said loop reactors. Polymerization reactors that can be connected in series, may in particular be used to prepare polyolefin having different properties in the different reactors under different conditions. Preferably, the invention relates to production of bimodal polyolefin with in two interconnected loop reactors. Preferably, the reactor of the present invention is one of the reactors of a multi loop reactor, more preferably a double loop reactor. Preferably, the reactor of the invention is connected in series with at least one other loop reactors. The polyolefin may be produced in a second reactor, but is preferably prepared in the first reactor. Following polymerization in the loop reactor of the invention (preferably into a bimodal polyolefin using two loop reactors), the polyolefin is preferably dried and preferably extruded into pellets.

The reactor path preferably has a length of from 80 to 140 meters, more preferably 95 to 125 meter, for instance about 110 meter. Preferably the reactor path contains the polymer slurry comprising monomer, optionally one or more co-monomer(s), a catalyst, optionally an activating agent, diluent and solid olefin polymer particles.

Preferably, the polymerization reaction is carried out at a temperature of higher than 88° C., more preferably higher than 89° C. and preferably lower than 95° C. and most preferably lower than 92° C. The reactor pressure is preferably held between 20 and 100 bar, 30 to 50 bar, more preferably at pressure of 37 to 45 bar. In an embodiment, the slurry flow can be set between 5 and 15 m/s.

The reactor preferably contains means for feeding monomer and diluent in the reactor. According to the invention, the reactor contain means for feeding catalyst in the reactor. Optionally, means for feeding an activating agent in the reactor are present. Preferably, the reactor further comprises a pump suitable for maintaining the polymer slurry in circulation in said reactor.

According to the invention, the means for feeding said catalyst in the reactor is spatially separated from the pump with a distance upstream to the pump of at least 20% of the length of the reactor path, preferably at least 30% and more preferably at least 50%. We have found that spatially separating the means for catalyst feeding from the pump in the reactor, fewer blockages occur when producing polyolefin, particularly polyethylene.

According to one embodiment of the invention, the catalyst and activating agent are mixed before addition. According to another embodiment, the reactor contains means for feeding catalyst in the reactor that is spatially separated from the means for feeding the activating agent with a distance upstream or downstream of at least 15% of the length of the reactor path, more preferably at least 20%, most preferably at least 40%. This allows a better control of the activity of the catalyst.

According to an embodiment, the catalyst is fed into a first loop reactor of a double loop reactor comprising a first loop reactor connected in series to a second loop reactor.

FIG. 1 represents a loop reactor 100, consisting of a plurality of interconnected pipes 104. The vertical sections of the pipe segments 104 are preferably provided with heat jackets 105. Polymerization heat can be extracted by means of cooling water circulating in these jackets of the reactor. Reactants are introduced into the reactor 100 by line 107. Activation agent, may be injected in the reactor 100 by means of the line 106A. According to an embodiment of the invention, the catalyst is injected in the reactor 100 by means of a line 106B which is provided at a distance upstream to the pump of at least 50% of the length of the reactor path. The polymerization slurry is directionally circulated throughout the loop reactor 100 as illustrated by the arrows 108 by one or more pumps, such as axial flow pump 101. The pump may be powered by an electric motor 102. As used herein the term "pump" includes any device that raise the pressure of a fluid, by means for example of a piston or set of rotating impellers 103. Reactor 100 is further provided with one or more settling legs 109 connected to the pipes 104 of the reactor 100. The settling legs 109 are preferably provided with an isolation valve 110. These valves 110 are open under normal conditions and can be closed for example to isolate a settling leg from operation. Further, the settling legs can be provided with product take off or discharge valves 111. The discharge valve 111 may be any type of valve, which can permit continuous or periodical discharge of polymer slurry, when it is fully open. Polymer slurry settled in the settling legs 109 may be removed by means of one or more product recovery lines 113, e.g. to a product recovery zone or for instance to a second loop reactor.

Figure 2:
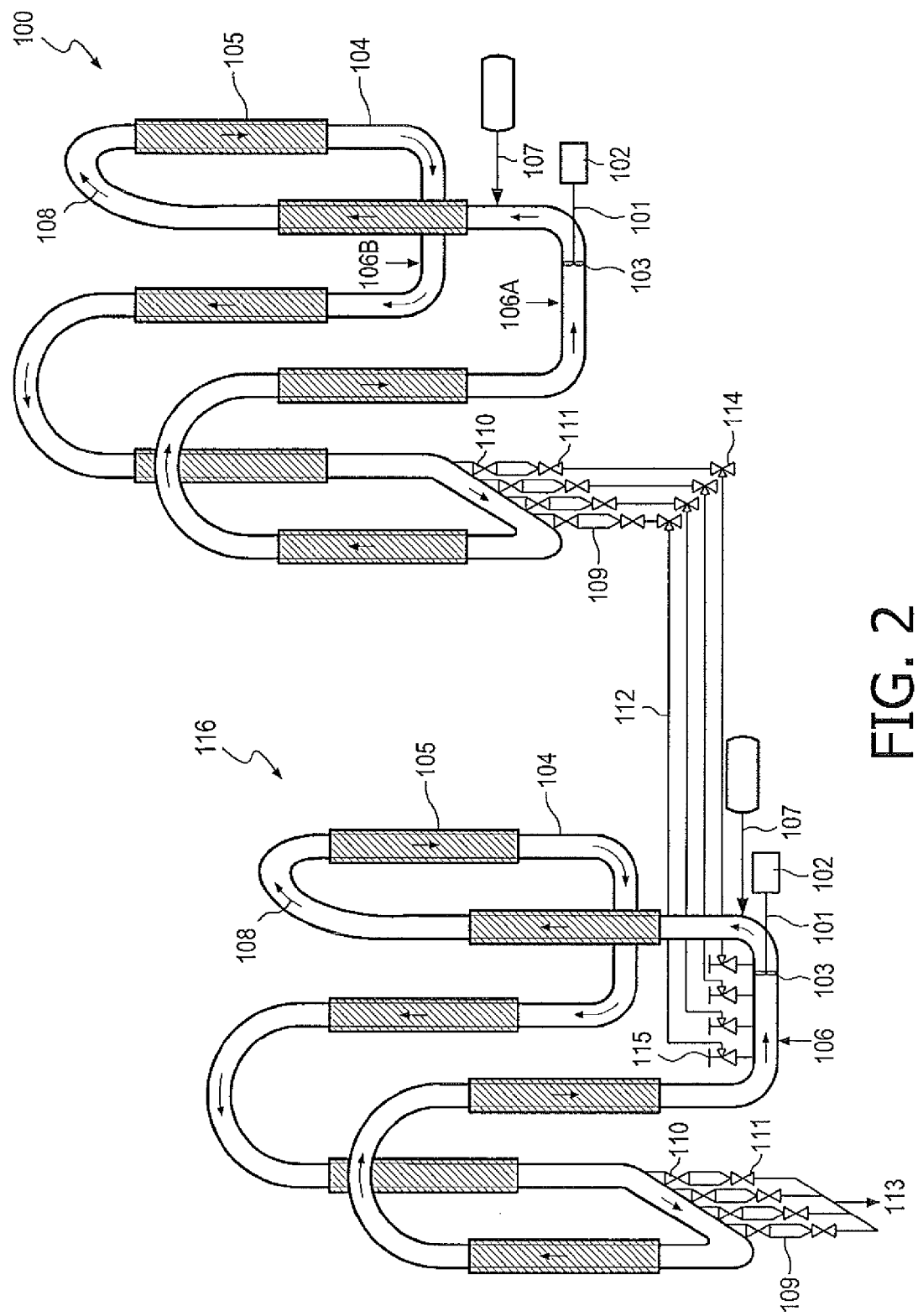
FIG. 2 schematically illustrates a double loop reactor that can be used in the preparation of the polyethylene according to an embodiment of the present invention.

FIG. 2 represents a double loop reactor with a first reactor 100 connected in series to second reactor 116. The reactors comprise a plurality of interconnected pipes 104. The vertical sections of the interconnected pipe segments 104 are preferably provided with heat jackets 105 to extract heat by means of cooling water. Reactants are introduced into the reactor 100 by line 107. Activation agent may be injected in the reactor 100 by means of the line 106A. According to an embodiment of the invention, the catalyst is injected in the reactor 100 by means of a line 106B which is provided at a distance upstream to the pump of at least 50% of the length of the reactor path. The polymerization slurry is directionally circulated throughout the loop reactor 100 as illustrated by the arrows 108 by one or more pumps, such as an axial flow pump 101. Pump 101 is powered by an electric motor 102, and comprises a set of rotating impellers 103. Reactor 100 is further provided with one or more settling legs 109 connected to the pipes 104 of the reactor 100.

The two loop reactors 100 and 116 are connected in series via the settling legs 109 of the first loop reactor 100. It will be understood that while the loop reactor 100 is illustrated with four settling legs 109, said loop reactor 100 may be equipped with less or more settling legs. The settling legs 109 of first loop reactor 100 are preferably provided with an isolation valve 110. Further, the settling legs can be provided with discharge valves 111. Downstream the valve 111 at the exit of the settling leg 109 of said first reactor 100, a transfer line 112 is provided which allows to transfer polymer slurry settled in the settling leg 109 to the second reactor 116, preferably through a piston valve 115. These transfer lines 112 comprise generally cylindrical, intermediate product transfer lines. Along the transfer line 112, a three-way valve 114 may divert the flow to a product recovery zone if the multiple loop reactor has to be used in a parallel configuration. Reactants are introduced into the reactor 116 by line 107, and settled polymer slurry from first reactor 100 by line 112 through valve 115. The polymerization slurry is directionally circulated throughout the second loop reactor 116 as illustrated by the arrows 108 by axial flow pump 101. Pump 101 is powered by an electric motor 102, and comprises a set of rotating impellers 103. The second reactor 116 is also provided with four settling legs 109. It will be understood that while the loop reactor 116 is illustrated with four settling legs 109, said loop reactor 116 may be equipped with less or more settling legs. The settling legs 109 of second loop reactor 116 are preferably provided with an isolation valve 110 and product take off or discharge valves 111. Polymer slurry settled in the settling legs 109 of the second reactor 116 may be removed by means of one or more product recovery lines 113 for instance to a product recovery zone.

Preferably, according to the present invention, the polyolefin reactor has a pump and a catalyst line, wherein the catalyst line is located at a distance to the pump of at least 20%, more preferably at least 30%, most preferably at least 40% of the length of the reactor path.

The following non-limiting examples illustrate the invention:

EXAMPLES

Example 1

A ZN catalyst slurry (0.7% by weight; d50 of 5 micron) was fed under 200-240 kg/h isobutane (iC4) flushing into a double loop reactor according to FIG. 2 via line 106B at a distance from the pump of approximately 50% of the length distance of the reactor path. TEAl activating agent (concentration of 20% by weight; at 50 ppm in the reactor) was fed with 100 kg/h iC4 in line 106A, located right before pump 101. Ethylene monomer was fed at 5-10° C. The reactor temperature was kept at 90° C. The solid particle content of the polymer slurry in the reactor was around 35% by weight.

Based on the above, the drawings, taking into account any constraints in PE production and with the objective of producing the polymers of the invention, it will be understood that the skilled man can correctly set the reactions conditions.

The loop reactor showed remarkable stability and no blockage of the reactor occurred. The polyethylene fluff from first reactor had an HLMI of 0.71 g/10 min and a density of 0.9413 g/cm$^3$.

After polymerization in a second loop reactor and extrusion, bimodal polymer pellets were obtained with a density of 0.959 g/cm³, that contained 47% of the polyethylene of the invention.

Example 2

The following polyethylene pellets were produced according to the process of Example 1 in which an activating agent was added. The HLMI and density are listed.

| Catalyst | ZN 5 μm | ZN 5 μm | ZN 5 μm |
|---|---|---|---|
| Activating agent | TEAI | MMEAI | TEAI |
| HLMI (g/10 min) | 24.5 | 30.2 | 22.3 |
| density (g/cm³) | 0.958 | 0.9586 | 0.9592 |

Example 3

Similar as to example 1, the following polymers were produced:

Use of ZN catalyst with a D50 of 5 μm (first run) led to a polyethylene from first reactor with HLMI of 0.11 g/10 min and density of 0.9355 g/cm³. A second run with similar conditions and using a ZN catalyst with D50 of 5 μm (second run) led to polyethylene from first reactor with HLMI of 0.09 g/10 min and density of 0.9357 g/cm³.

After reaction in the second loop reactor and extrusion, bimodal polymer pellets were obtained with around 46% of polyethylene having an HLMI of 6.6 g/10 min and density of 0.9556 g/cm³ for the ZN catalyst of D50 of 5 μm (first run) and with around 46% by weight of the polyethylene having an HLMI of 6.8 g/10 min and density of 0.9562 g/cm³ for the ZN catalyst of D50 of 5 μm (second run).

The invention claimed is:

1. A loop reactor system for the polymerization of olefin monomer, wherein said loop reactor comprises:
    a plurality of interconnected pipes defining a reactor path for a polymer slurry, said polymer slurry comprising monomer, a catalyst, solid olefin polymer particles, optionally one or more co-monomer(s), optionally hydrogen, and an activating agent;
    a line adapted for feeding monomer, optionally one or more co-monomer(s) and optionally hydrogen into the loop reactor;
    a catalyst slurry storage tank;
    a line adapted for feeding catalyst slurry from the catalyst slurry storage tank into the loop reactor under diluent flushing at a rate of larger than 100 kg/h and lower than 250 kg/h and with a velocity at least 7 m/s and at most 40 m/s, and wherein a concentration of the catalyst in the catalyst slurry at a feeding site into the loop reactor is lower than 1.0% by weight;
    a line adapted for feeding an activating agent into the loop reactor, wherein the line adapted for feeding said catalyst slurry into the loop reactor is spatially separated from the line adapted for feeding the activating agent by a distance upstream or downstream of at least 15% of a length of the reactor path; and
    a pump suitable for maintaining the polymer slurry in circulation in said loop reactor, characterized in that said line adapted for feeding said catalyst into the loop reactor is spatially separated from the pump at a distance upstream to the pump of at least 20% of the length of the reactor path.

2. The loop reactor system according to claim 1, wherein the line adapted for feeding said catalyst slurry into the loop reactor is spatially separated from the line adapted for feeding the activating agent by a distance upstream or downstream of at least 40% of the length of the reactor path.

3. The loop reactor system according to claim 1, wherein the loop reactor is connected in series with another loop reactor.

4. The loop reactor system according to claim 1, wherein the line adapted for feeding the catalyst slurry in the loop reactor is spatially separated from the pump at a distance upstream to the pump of at least 50% the length of the reactor path.

5. The loop reactor system according to claim 1, wherein the line adapted for feeding the catalyst slurry in the loop reactor is spatially separated from the pump at a distance upstream to the pump of about 50% the length of the reactor path.

6. The loop reactor system according to claim 1, wherein the line adapted for feeding the catalyst slurry in the loop reactor is spatially separated from the pump at a distance upstream to the pump of at least 95% the length of the reactor path.

7. The loop reactor system according to claim 1, wherein the line adapted for feeding the catalyst slurry in the loop reactor is at an outlet flange of the pump.

8. The loop reactor system according to claim 1, wherein the length of the reactor path ranges from 80 to 140 meters.

9. The loop reactor system according to claim 1, wherein the catalyst has a median particle size (d50) smaller than 50 μm.

10. The loop reactor system of claim 1, wherein a concentration of the catalyst in the catalyst slurry at a feeding site into the loop reactor is lower than 1.0% by weight.

11. The loop reactor system according to claim 1, wherein the loop reactor is a double loop reactor.

12. The loop reactor system according to claim 10, wherein the double loop reactor comprises a first loop reactor connected in series to a second loop reactor, and wherein the line adapted for feeding the catalyst into the loop reactor feeds the catalyst into the first loop reactor.

13. The loop reactor system according to claim 1, wherein the activating agent is fed to the loop reactor in an activating agent slurry via the line adapted for feeding the activating agent.

14. A loop reactor system suitable for the polymerization of olefin monomer, wherein said loop reactor comprises:
    a plurality of interconnected pipes defining a reactor path for a polymer slurry, said polymer slurry comprising monomer, a catalyst, solid olefin polymer particles, optionally one or more co-monomer(s), optionally hydrogen, and an activating agent;
    a line adapted for feeding monomer, optionally one or more co-monomer(s) and optionally hydrogen into the loop reactor;
    a catalyst slurry storage tank;
    a single line adapted for feeding catalyst slurry from the catalyst slurry storage tank into the loop reactor under diluent flushing at a rate of larger than 100 kg/h and lower than 250 kg/h and with a velocity at least 7 m/s and at most 40 m/s, wherein the catalyst slurry comprises catalyst solid particles having an average particle diameter (d50) smaller than 50 μm and diluent, and wherein a concentration of the catalyst in the catalyst slurry at a feeding site into the loop reactor is lower than 1.0% by weight;

a line adapted for feeding an activating agent slurry into the loop reactor, wherein the line adapted for feeding said catalyst slurry into the loop reactor is spatially separated from the line adapted for feeding the activating agent slurry by a distance upstream or downstream of at least 15% of a length of the reactor path; and a pump suitable for maintaining the polymer slurry in circulation in said loop reactor, characterized in that said line adapted for feeding said catalyst slurry into the loop reactor is spatially separated from the pump at a distance upstream to the pump of at least 20% of the length of the reactor path.

15. The loop reactor system according to claim 14, wherein the line adapted for feeding the catalyst slurry in the loop reactor is spatially separated from the pump at a distance upstream to the pump of about 50% the length of the reactor path.

16. A loop reactor system suitable for the polymerization of olefin monomer, wherein said loop reactor comprises:

a plurality of interconnected pipes defining a reactor path for a polymer slurry, said polymer slurry comprising monomer, a catalyst, solid olefin polymer particles, optionally one or more co-monomer(s), optionally hydrogen, and optionally an activating agent;

a line adapted for feeding monomer, optionally one or more co-monomer(s) and optionally hydrogen into the loop reactor;

a catalyst slurry storage tank;

a line adapted for feeding catalyst slurry from the catalyst slurry storage tank into the loop reactor under diluent flushing at a rate of larger than 100 kg/h and lower than 250 kg/h and with a velocity at least 7 m/s and at most 40 m/s, wherein the catalyst slurry comprises catalyst solid particles having an average particle diameter (d50) smaller than 50 μm and a diluent, and wherein a concentration of the catalyst in the catalyst slurry at a feeding site into the loop reactor is lower than 1.0% by weight;

a pump suitable for maintaining the polymer slurry in circulation in said loop reactor, characterized in that said line adapted for feeding said catalyst slurry into the loop reactor is spatially separated from the pump at a distance upstream to the pump of about 50% of a length of the reactor path.

17. The loop reactor system of claim 16, further comprising a line adapted for feeding an activating agent slurry into the loop reactor, wherein the line adapted for feeding said catalyst slurry into the loop reactor is spatially separated from the line adapted for feeding the activating agent slurry by a distance upstream or downstream of at least 15% of the length of the reactor path.

18. The loop reactor system of claim 16, wherein the catalyst slurry is mixed with a preactivating agent prior to being fed into the loop reactor.

* * * * *